(12) United States Patent
Chang et al.

(10) Patent No.: US 12,321,807 B1
(45) Date of Patent: Jun. 3, 2025

(54) NEAR-FIELD COMMUNICATION (NFC) ON TEST DEVICE

(71) Applicant: VeEX Inc., Fremont, CA (US)

(72) Inventors: Paul Chang, Fremont, CA (US); Cyrille Morelle, Los Altos, CA (US); Ildefonso Miguel Polo, San Jose, CA (US); Cesar Kyle Della Casil, Santa Clara, CA (US); Monica Hua, San Jose, CA (US); Tri Khai Nguyen, San Jose, CA (US); Eugene Belianka, Fanipol (BY); Dmitriy Popesku, Minsk (BY)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 18/385,819

(22) Filed: Oct. 31, 2023

(51) Int. Cl.
*G06K 7/10* (2006.01)
*H04B 5/72* (2024.01)
*H04M 1/72412* (2021.01)
*H04M 1/72445* (2021.01)

(52) U.S. Cl.
CPC .......... *G06K 7/10297* (2013.01); *H04B 5/72* (2024.01); *H04M 1/72412* (2021.01); *H04M 1/72445* (2021.01)

(58) Field of Classification Search
None
See application file for complete search history.

(56) References Cited

U.S. PATENT DOCUMENTS

| | | | |
|---|---|---|---|
| 8,856,211 B1 | 10/2014 | Kassamali et al. | |
| 8,936,194 B1 | 1/2015 | Welch et al. | |
| 9,173,092 B1 * | 10/2015 | Hohpe | ................... H04W 12/02 |
| 9,686,026 B1 * | 6/2017 | Reed | ..................... H04W 24/02 |
| 11,176,343 B2 | 11/2021 | Roux et al. | |
| 2016/0117581 A1 | 4/2016 | Ortega | |
| 2017/0237800 A1 | 8/2017 | Carruthers | |
| 2019/0042819 A1 | 2/2019 | Agarwal et al. | |
| 2020/0110974 A1 | 4/2020 | Norris et al. | |
| 2020/0351311 A1 | 11/2020 | Mayet | |
| 2021/0243185 A1 | 8/2021 | Thasale | |
| 2022/0174068 A1 | 6/2022 | Buida et al. | |

* cited by examiner

*Primary Examiner* — Kristy A Haupt
(74) *Attorney, Agent, or Firm* — Sheppard Mullin Richter & Hampton LLP

(57) ABSTRACT

Methods, systems, and non-transitory computer readable media are configured to perform operations comprising determining, by a device, one or more parameters and associated parameter values of a network operating condition; storing, by the device, data associated with on the one or more parameters and associated parameter values in a Near-Field Communication (NFC) device of the device; and providing, by the device, the data to a computing system that is different from the device.

20 Claims, 14 Drawing Sheets

1100

Determine, by a device, one or more parameters and associated parameter values of a network operating condition
1102

Store, by the device, data associated with on the one or more parameters and associated parameter values in a Near Field Communication (NFC) device of the device
1104

Provide, by the device, the data to a computing system that is different from the device
1106

Obtain encoded data in a URL contained in a code associated with a test performed on a communications network
1202

Decode the encoded data to determine at least one of measurement data or contextual data associated with the test
1204

Provide the at least one of measurement data or contextual data on a page for presentation on a computing device
1206

FIGURE 12

NEAR-FIELD COMMUNICATION (NFC) ON TEST DEVICE

FIELD OF THE INVENTION

The present technology relates to testing and measurement of communications networks and related equipment. More particularly, the present technology relates to access to and communication of measurement results.

BACKGROUND

Various types of communications networks are available to deliver a wide array of services. Communications networks can be supported by various technologies, including, for example, cable networks, fiber optic networks, Ethernet, Wi-Fi, DSL, mobile, etc. Communications networks warrant monitoring and testing to assess their operation and to allow troubleshooting when problems arise. Appropriately configured test devices can measure and evaluate different aspects of communications networks to determine their operating conditions and performance.

SUMMARY

Various embodiments of the present technology can include methods, systems, non-transitory computer readable media configured to perform operations comprising determining, by a device, one or more parameters and associated parameter values of a network operating condition; storing, by the device, data associated with on the one or more parameters and associated parameter values in a Near-Field Communication (NFC) device of the device; and providing, by the device, the data to a computing system that is different from the device.

In some embodiments, the data is readable by an NFC reader of the computing device when the NFC reader is within a predetermined distance from the NFC device.

In some embodiments, the data is readable by the computing device without interaction between the computing device and a display of the device.

In some embodiments, the providing the data to the computing system is performed by the NFC device when the device is not powered on.

In some embodiments, the operations further comprise: receiving, by the device, data from an NFC reader of the computing system.

In some embodiments, the operations further comprise: removing, by the device, the data from the NFC device in response to receipt of an acknowledgement that an NFC reader received the data.

In some embodiments, the data is associated with a URL.

In some embodiments, the data is encrypted.

In some embodiments, the data is decrypted and decoded by a server system or a custom application running on the computing system to determine the one or more parameters and associated parameter values.

In some embodiments, a custom application running on the computing system can read and decode a URL associated with the data and render a page including the one or more parameters and associated parameter values without a web browser or a server system.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 11 illustrates an example method, according to various embodiments of the present technology.

FIG. 12 illustrates an example method, according to various embodiments of the present technology.

Figure 1:
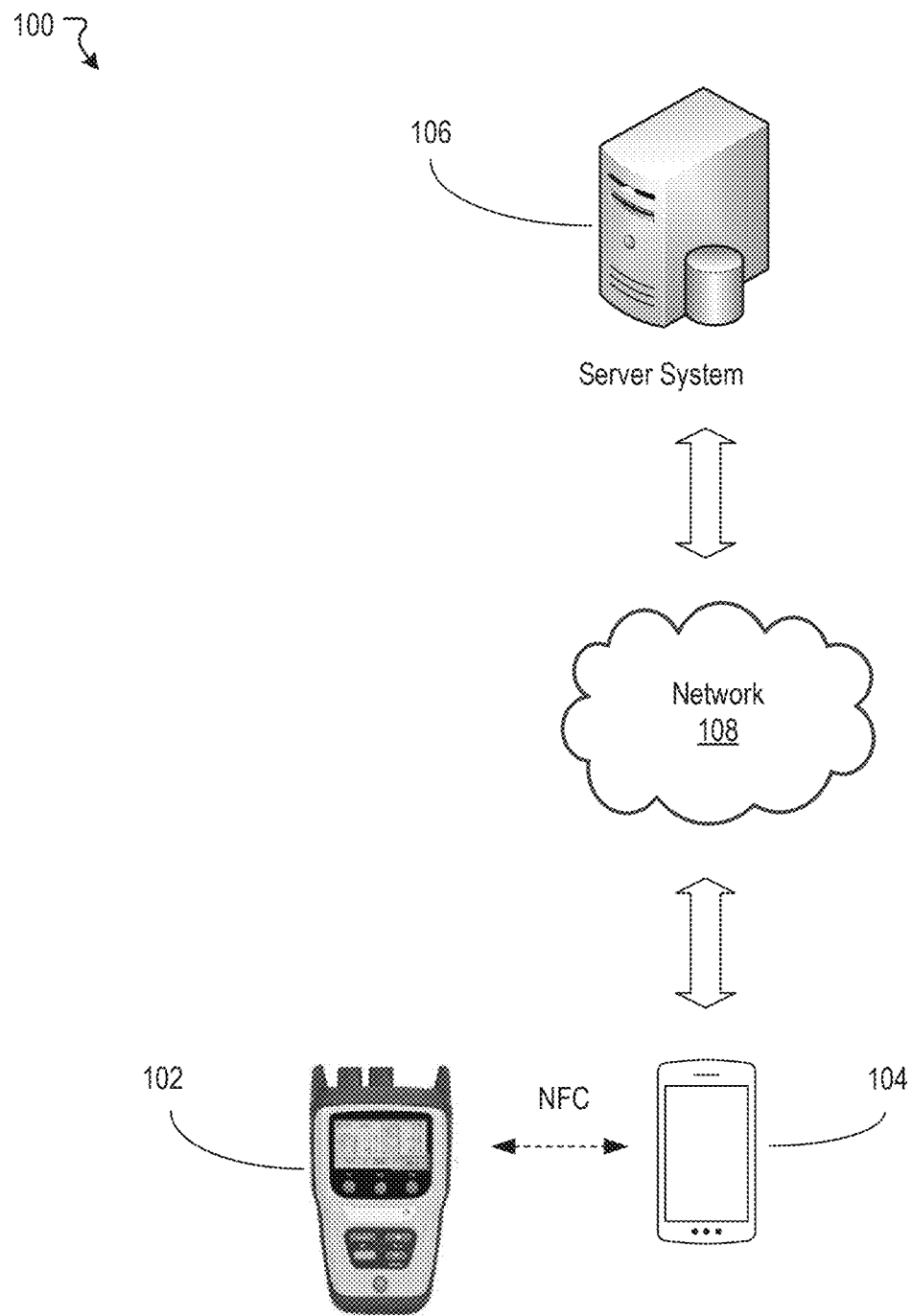
FIG. 1 illustrates an example system, according to various embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Various types of communications networks are available to deliver a wide array of services. Communications networks can be supported by various technologies, including, for example, cable networks, fiber optic networks, Ethernet, Wi-Fi, DSL, mobile, etc. Communications networks warrant monitoring and testing to assess their operation and to allow troubleshooting when problems arise. Appropriately configured test devices can measure and evaluate different aspects of communications networks to determine their operating conditions and performance.

Conventional test devices (or measurement devices) can be used by field technicians to measure and monitor various characteristics of a communications network. Such conventional test devices can provide different functionality relating to, for example, spectrum analysis, power measurement, loss testing, fault location, signal multiplexing, light generation, etc. After utilizing a conventional test device to obtain a measurement about some aspect of a communication network, measurement data associated with the measurement may be reported to or shared with others to provide an indication about the operating condition of the communication network. For example, a field technician may be assigned to perform a repair on the communication network. In this example, the field technician can report the measurement data to a service provider in control of the communications network to demonstrate successful repair and proper operation of the communications network.

Reporting of measurement data can be problematic in many respects. For example, a field technician may need to read measurement data from the conventional test device and manually transcribe the measurement data in a separate record before providing the record to others. Such a technique can be cumbersome and inefficient, especially when the amount of measurement data is large. Further, because of the compact form factor of many test devices, display of measurement data can be difficult for a field technician to read. Accordingly, the measurement data can be incorrectly read from conventional test devices and incorrect measurement data can be communicated to others. Even when measurement data is correctly read from a conventional test device, the measurement data can be incorrectly transcribed or recorded through inadvertence by a field technician. Or, in some situations, measurement data determined by a conventional test device can be deliberately altered. In both cases, inaccurate measurement data is undesirably provided to others.

An improved approach rooted in computer technology overcomes the foregoing and other disadvantages associated with conventional approaches specifically arising in the realm of computer technology. Based on computer technology, the present technology provides a device, such as a test device (or measurement device), configured to generate measurement data and contextual data. The test device can obtain the measurement data through measurement during a test. The measurement data can reflect various parameters and associated parameter values reflective of operating conditions of the communications network or related equipment. The contextual data can be information associated with the test device or the test. In some cases, the test device can encode at least a portion of the measurement data and the contextual data to generate encoded data. A URL including a domain (and subdomain) associated with a server system of an entity and the encoded data can be generated. The URL can be stored in a Near-Field Communication (NFC) device of the test device.

A computing device associated with the field technician, such as a smartphone, can include an NFC reader. When the NFC reader of the computing device is positioned within a selected distance from the NFC device of the test device, the NFC reader can read the URL stored in the NFC device. The URL can be read in this manner to allow the computing device to access a website maintained by the server system of the entity. The server system can receive and decode the encoded data to recover the measurement data and the contextual data. The server system can provide, for example, the measurement data and the contextual data on a page for display on the computing device. The page can be rendered through a conventional browser running on the computing device. After display of the page on the computing device, the field technician can add additional data to the page. Based on a menu of options to share the page, the field technician can select an option to communicate information on the page to others through a variety of sharing techniques. In addition, the NFC reader of the computing device also can transmit ("write") information to the NFC device of the test device. In some embodiments, the present technology does not require or utilize software (e.g., an application) created by the entity to be installed or otherwise stored on the computing device.

The present technology thus poses myriad advantages over conventional techniques. The present technology automates and thus simplifies the sharing of detailed measurement data and contextual data associated with a test performed by a test device. Further, the use of NFC in accordance with the present technology allows more detailed test result data, such as parameters and associated parameter values, to be conveyed in comparison to simplistic "pass" or "fail" indications displayed on conventional test devices. In addition, the present technology prevents the communication of inaccurate measurement data through manual error or intervention. Further, because no dedicated software is utilized on a computing device, the significant expense and burden of deploying such software across computing devices of a large organization of field technicians are avoided. Another advantage of the present technology is that a readily available computing device, such as a smartphone, is leveraged to communicate measurement data and contextual data determined by a test device to others. Utilization of the computing device in this manner obviates the need to add extensive, expensive communication capabilities to the test device itself.

Moreover, the use of an NFC device on a test device that is accessible to an NFC reader of a computing device poses many advantages over other potential forms of communication between the test device and the computing device. For example, the display by a test device of a QR code associated with test results to be scanned by a smartphone is suboptimal in many respects. Use of a QR code in this manner would require that a test device contain a display screen, thus increasing manufacturing time and expense associated with the test device. As another example, use of a QR code would require the test device to be powered on to make the QR code scannable by a smartphone. This requirement would increase the burden on a field technician by requiring dedicated handling and manipulation of the test device for this particular purpose. To the extent the test device would require a command to generate or display the QR code, the burden on the technician would increase. Furthermore, the need to power on the test device for the QR code would be an additional drain on the power supply of the test device. As yet another example, the transmission of the QR code from the test device to the smartphone is merely one-way, and cannot support bidirectional communications between the test device and the smartphone. These and other limitations associated with use of a QR code are overcome by the present technology. Inventive features of the present technology are discussed in more detail below.

FIG. 1 illustrates an example system 100, according to various embodiments of the present technology. The system 100 can include a test device 102, a computing device 104, and a server system 106. The test device 102 can be any suitable test device or measurement device. The test device 102 can be coupled to a communications network or equipment to measure various characteristics, or parameters, of the communications network. The parameters and associated parameter values that are measured by the test device 102 can reflect operating conditions of the communications network. The test device 102 can be utilized by field technicians in all stages of network deployment, maintenance, field servicing, and service verification across various types of communication networks, such as Fiber Optics, CATV/DOCSIS, Mobile, Next-Generation Transport Network, Fibre Channel, IPTV, Wi-Fi, and various Ethernet technologies.

In some embodiments, the test device 102 can embed or include a Near-Field Communication (NFC) device, such as an NFC tag or chip, that can communicate with other computing systems or devices using an NFC communication protocol or link. The test device 102 can bidirectionally communicate (e.g., exchange data) with other computing systems or devices using an NFC communication protocol or technology, as discussed in more detail herein. In some embodiments, the test device 102 can be unable to communicate with other computing systems or devices using broadband, Wi-Fi, Bluetooth, or certain other communication protocols or technologies. In some embodiments, the test device 102 can communicate with other computing systems or devices using an NFC communication protocol or technology and also, for example, broadband, Wi-Fi, Bluetooth, and certain other communication protocols or technologies.

Figure 2A:
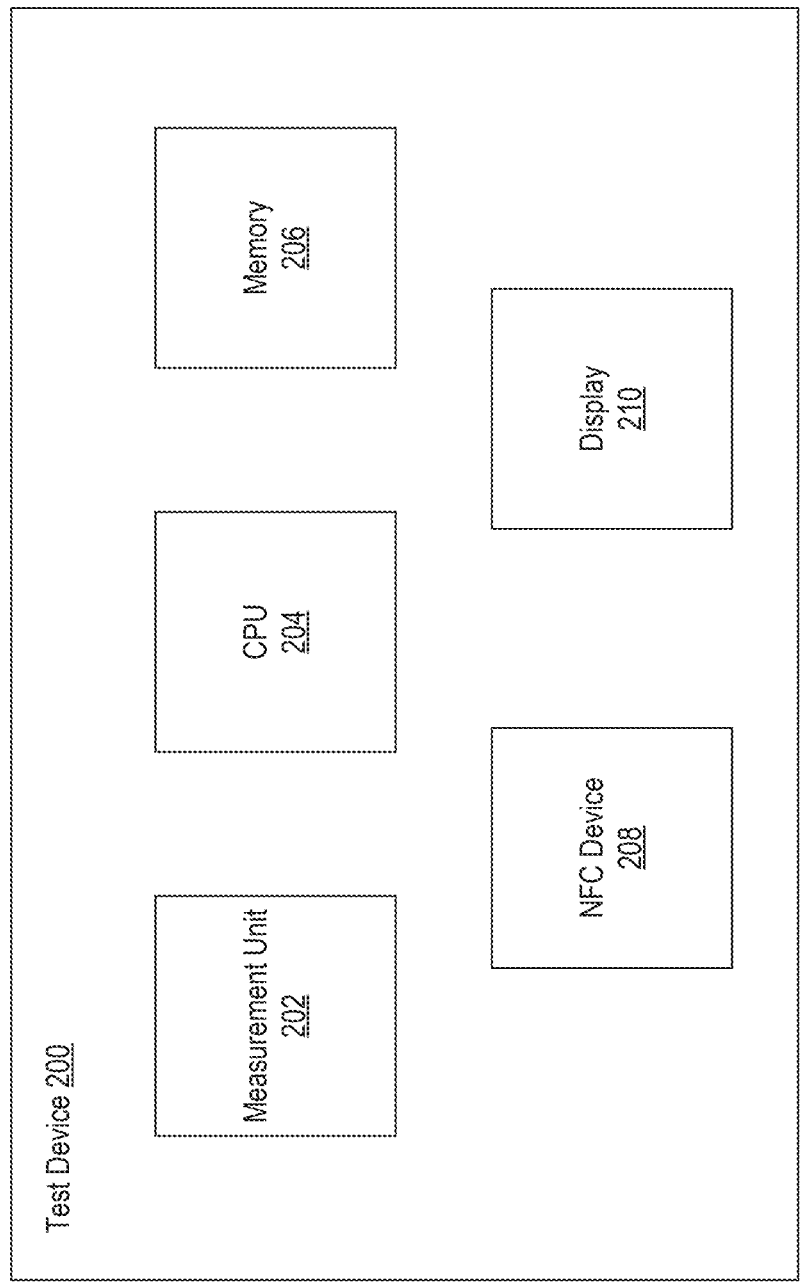
FIG. 2A illustrates a simplified block diagram of a test device, according to various embodiments of the present technology.

The test device 102 can store measurement data resulting from a test of the communications network performed by the test device 102, as well as contextual data associated with the test device 102 or the test. The measurement data and the contextual data (or associated code) can be stored by or in the NFC device of the test device 102. In some embodiments, the measurement data and the contextual data can be stored in the NFC device without encoding the measurement data and the contextual data. In some embodiments, the measurement data and the contextual data can be stored in the NFC device after encoding the measurement data and the contextual data, as discussed herein. A URL can be generated based on the encoded measurement data and the encoded contextual data, as discussed herein. The URL can address a website run or managed by the server system 106. The URL can include a domain (and subdomain) associated with the website. The URL further can include the encoded measurement data and the encoded contextual data. The URL can be stored in the NFC device to be readable by an NFC reader of the computing device 104. In addition, the NFC device of the test device 102 can receive information transmitted by the NFC reader of the computing device 104. The test device 102 can be manufactured or sold by an entity (e.g., company, corporation, organization, etc.). In some embodiments, the test device 102 can be a special purpose computing device configured to perform specific measurements or tests of a communications network. In some embodiments, the test device 102 can be a computing system as illustrated in FIG. 2A.

The computing device 104 can be any computing device. For example, the computing device 104 can be a smartphone, a tablet, a smartwatch, or other type of mobile computing device. In some embodiments, the computing device 104 can include a built-in NFC reader or a custom software application that has an NFC reader. The NFC reader can provide functionality supported by any appropriately configured operating system or application running on the computing device 104. In addition, the computing device 104 can include a web browser (or browser). The browser can be supported or implemented by any appropriately configured operating system or application running on the computing device 104. The NFC reader of the computing device 104 also can transmit (or write) information to the NFC device of the test device 102.

In some embodiments, the computing device 104 does not include or have any software (e.g., an application) that was created or endorsed by the entity that manufactures or sells the test device 102. In some embodiments, the computing device 104 can be controlled by a field technician who is operating the test device 102. The computing device 104 can communicate with the server system 106 over a network 108, such as the Internet. In some embodiments, the computing device 104 can be manufactured and sold by an entity that is different from the entity that manufactures or sells the test device 102.

The computing device 104 can be positioned by a field technician so that the NFC reader of the computing device 104 is within the proximity of the NFC device of the test device 102. The NFC reader of the computing device 104 can read data (e.g., URL) stored in the NFC device of the test device 102. In some embodiments, based on the URL, the browser on the computing device 104 can initiate communications over the network 108 (e.g., Internet) between the computing device 104 and a website addressed by the URL and render a page. In some embodiments, the field technician can use a custom software application on the computing device 104 to read and decode the URL to render an associated page without using a web browser or a server system. In some instances, if the code or associated URL has been encrypted, the custom software application can decrypt the code or associated URL. The page can include measurement data and contextual data, such as parameters and related parameter values measured by the test device 102. The parameters and related parameter values can be presented on the page generated by the customer software application in a variety of rich and dynamic presentation formats that are different from presentation on a page generated by a browser.

In some embodiments, upon reading by the NFC reader of the URL stored in the NFC device, a browser of the computing device 104 can be directed by the associated URL to a website run by the server system 106 and controlled by an entity. In some embodiments, the entity controlling the website can be the same entity that manufactured or sold the test device 102. In some embodiments, the entity controlling the website can be different from the entity that manufactured or sold the test device 102. The browser of the computing device 104 can render a page provided by the website. The page generated by the browser can include measurement data and contextual data, such as parameters and related parameter values measured by the test device 102. For example, the parameters and related parameter values can be displayed as plain text. In some embodiments, the page also can include fields that prompt the field technician to provide additional information. Upon provision of additional information through the page, the browser can render a revised page on the computing device 104 that includes the additional information. The page can include a plurality of selectable options to provide the information in the page to others through a variety of sharing techniques, as discussed in more detail herein.

The server system 106 can maintain and run a website addressed by the URL. The server system 106 can decode the encoded data, such as the encoded parameters and parameter values, in the URL. In some instances, if the encoded data has been encrypted, the server system 106 can decrypt the encoded data. The server system 106 can include the decoded parameters and parameters values in a page that is renderable on the browser of the computing device 104. The server system 106 also can receive additional information from the computing device 104 to include in an updated or revised page that includes the parameters and associated parameter values as well as the additional information. The server system 106 can generate the page or the revised page to include a plurality of selectable sharing techniques. Selection of a particular sharing technique can allow a field technician to provide the information in the page in a desired manner as a report to others. In this way, the information, including the parameters and associated parameter values that are measured by the test device 102, can be faithfully and accurately shared with others without risks or problems posed by manual intervention. In some embodiments, the server system 106 can be operated or controlled by the same entity that manufactures or sells the test device 102. In some embodiments, the field technician operating the test device 102 can be employed by or affiliated with an entity that is different from the entity that operates or controls the server system 106. More details regarding the functionality of the test device 102, the computing device 104, and the server system 106 are provided herein.

FIG. 2A illustrates a simplified block diagram of a test device 200, according to various embodiments of the present technology. In some embodiments, the test device 200 can be an implementation of the test device 102. The test device 200 can include a measurement unit 202, a central processing unit (CPU) 204, a memory 206, an NFC device 208, and a display 210. In some embodiments, the test device 200 does not have a display. The components (e.g., units, modules, elements, blocks, functions, etc.) shown in this figure and all figures herein are exemplary only, and other implementations may include additional, fewer, integrated, or different components. Some components may not be shown so as not to obscure relevant details. Some components may be simplified so as to allow focus on relevant details. The test device 200 can perform tests on a communications network and make measurements regarding operating conditions of the communications network. For example, the test device 200 can make optical power measurements of an optical fiber network.

Under control of the CPU 204, the measurement unit 202 can support testing of fibers, and signals carried by the fibers, of a communications network. The measurement unit 202 can include various components. The measurement unit 202 can include an optical power meter that can be configured to measure optical power of wavelengths of light received by the measurement unit 202. The optical power meter, for example, can measure an intensity or power of a wavelength of light transmitted over a selected fiber. The optical power of the wavelength of light transmitted over the fiber as measured by the optical power meter can be stored in the memory 206 and accessed by the CPU 204 in the calculation of various parameters associated with testing of the fiber. In addition to the optical power meter, the measurement unit 202 can contain other components that support operation of the optical power meter and other components that otherwise provide functionality supportive of desired testing capabilities and configurations. For example, in some embodiments, the measurement unit 202 can include an optical light source. The optical light source can be configured to generate one or more wavelengths of light for provision across fibers of a communications network. In some embodiments, the optical light source can be implemented using one or a plurality of fixed wavelength lasers. Each fixed wavelength laser can produce a particular wavelength of light. In some embodiments, the optical light source can be implemented using one or more tunable lasers. The optical light source can be configured to generate one or more wavelengths of light at fixed or desired optical power levels. The optical light source can be calibrated such that each of the wavelengths of light is generated at a fixed, desired, or otherwise known optical power level. For example, the known optical power level of a wavelength of light transmitted by the optical light source over a selected fiber (as well as other characteristics of the wavelength of light) can be stored in the memory 206 and accessed by the CPU 204 in the calculation of various parameters associated with testing of the fiber. In some embodiments, the measurement unit 202 can include an optical switch. Many variations are possible.

The NFC device 208 embedded in the test device 200 can be or include an NFC tag, chip, or unit. The NFC device 208 can have any suitable configuration or capability, such as Type 1, Type 2, Type 3, Type 4, Type 5, or another type of NFC tag. The NFC device 208 can take any suitable form, such as a sticker, inlay, label, disc, etc. The NFC device 208 can have read/write capabilities and a suitable memory capacity. The NFC device 208 can support bidirectional communication between the test device 200 and a separate computing device (e.g., the computing device 104) that includes an NFC reader.

The NFC device 208 can store measurement data and contextual data associated with tests of a communications network performed by the test device 200. For example, the measurement data and the contextual data that can be stored in the NFC device 208 can be associated with one or more tests of one or more communications networks. For instance, the measurement data and the contextual data that can be stored in the NFC device 208 can be associated with a most recently performed test or a selected plurality of previously performed tests as conducted by the test device 200. In some embodiments, the measurement data and the contextual data can be encoded, as discussed herein, before the encoded measurement data and the encoded contextual data are stored in the NFC device 208. The information stored in the NFC device 208 can be read by an NFC reader, such as the NFC reader embedded the computing device 104. When the NFC reader is within a selected or predetermined distance from the NFC device 208, the NFC reader can energize the NFC device 208, causing the NFC device 208 to transmit data stored in the NFC device 208 to the NFC reader. The NFC reader can read the information stored in the NFC device 208 without the test device 200 being powered on. The data stored in the NFC device 208 can be read by the NFC reader of the computing device without interaction specifically between the computing device (or NFC reader of the computing device) and the display 210 of the test device 200. In this regard, the computing device can access the measurement data and the contextual data stored in the NFC device 208 without specifically reading the display 210.

The NFC device 208 can receive data from the NFC reader of the computing device 104 when the NFC reader transmits (writes) data to the NFC device 208. For example, the NFC device 208 can receive from the NFC reader an acknowledgement that data stored in the NFC device 208 has been received by the NFC reader. The NFC device 208 can receive data from the NFC reader even when the test device 200 is not powered on. In some embodiments, the NFC device 208 can remove the data from the NFC device 208 upon receipt of the acknowledgement or after a threshold amount of time after receipt of the acknowledgement. As another example, the NFC device 208 can receive from the NFC reader test profiles or test configurations for tests to be performed by the test device 200. The test device 200 can access the test profiles or test configurations from the NFC device 208 and perform tests based on the test profiles or test configurations. Information provided by the NFC reader that is associated with a test and stored in the NFC device 208 can be automatically removed from the NFC device 208 after performance of the test or after a command from an operator of the test device 200 to remove the information.

In some embodiments, the display 210, if included in the test device 200, can present an interface with which an operator can interact to control the test device 200. For example, an operator can interact with the display 210 to trigger storage of measurement data and contextual data in the NFC device 208. For instance, the interface can include a button or other reference that can be selected by the operator to cause such storage. In some embodiments, storage of measurement data and contextual data in the NFC device 208 is automatic, and does not involve and is not based on or triggered by any interaction by the operator with the display 210 or the test device 200. As another example, an operator can interact with the display to view information stored in the NFC device 208 and received from an NFC reader. The information can be associated with one or more test profiles or test configurations that describe tests to be performed by the test device 200. For example, the operator can select or enter a command to view the information and to initiate performance by the test device 200 of a selected test. In some embodiments, as mentioned, the test device 200 does not have a display.

Figure 2B:
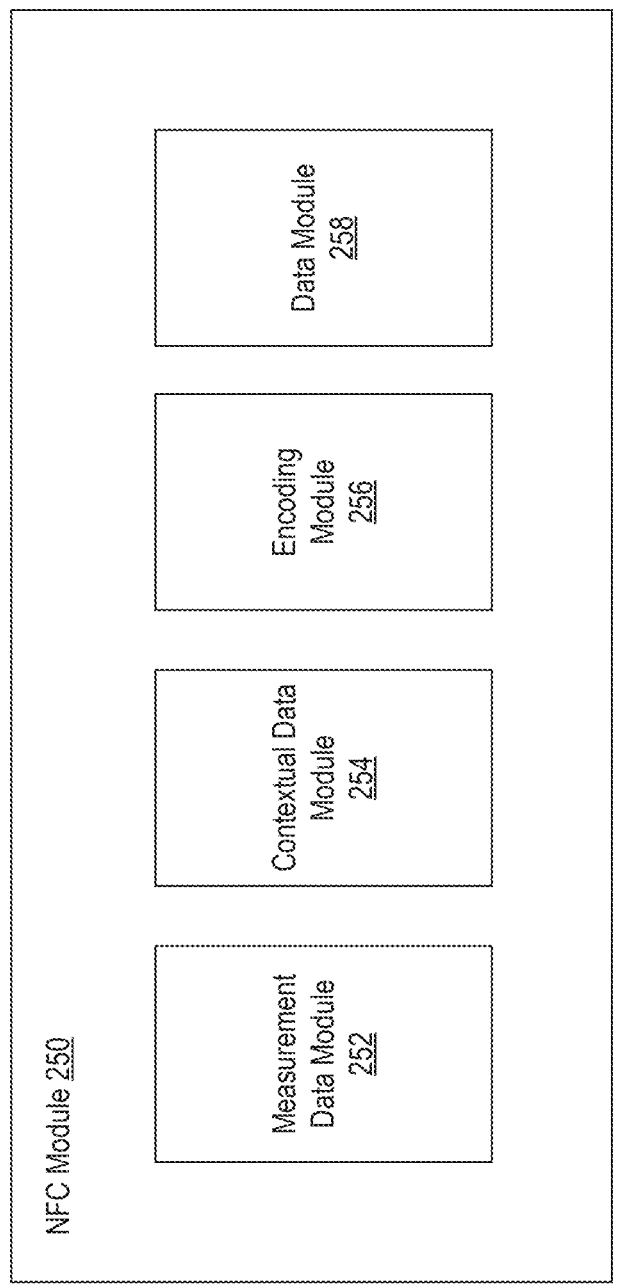
FIG. 2B illustrates an example NFC module, according to various embodiments of the present technology.

FIG. 2B illustrates an example NFC module 250, according to various embodiments of the present technology. The functionality of the NFC module 250 can be provided by instructions stored in a memory of the test device 200 (or the test device 102) that are executable by a processor of the test device 200. The NFC module 250 can include a measurement data module 252, a contextual data module 254, an encoding module 256, and a data module 258. As indicated, the components (e.g., modules, elements, interfaces, blocks, functions, filters, switches, etc.) shown in this figure and all figures herein are exemplary only, and other implementations may include additional, fewer, integrated, or different components. Some components may not be shown so as not to obscure relevant details. Some components may be simplified so as to allow focus on relevant details.

The measurement data module 252 can receive, obtain, or determine measurement data associated with measurements taken by the test device 200. The measurement data can relate to any parameters (or keys) of a communications network or related equipment and their measured values that can reflect operating conditions of the communications network. The measurement data can allow a field technician in control of the test device 200 or others having access to the measurement data to assess performance of the communications network. As just some examples, the measurement data can be associated with observed or detected power levels (e.g., electrical, optical), frequencies, wavelengths, data speeds (upstream, downstream), lengths of cables (e.g., fiber cable), voltage levels, error rates, alarms, etc. The measurement data module 252 can acquire the measurement data to include in a URL.

The contextual data module 254 can obtain or determine contextual data apart from measurements taken by the test device 200. The contextual data can be associated with the test device 200 or a test performed by the test device 200. For example, the contextual data can include a type (or mode) of test performed by the test device 200 and an identifier (e.g., serial number) of the test device 200. In some embodiments, the contextual data can include a time stamp that describes a date and time (or time interval) when the measurements were taken by the test device 200.

The encoding module 256 can encode some or all of the measurement data, which includes parameters and associated parameter values, and the contextual data to generate encoded data. For example, the encoding module 256 can encode all of the measurement data and all of the contextual data, all of the measurement data and a portion of the contextual data, a portion of the measurement data and all of the contextual data, or a portion of the measurement data and a portion of the contextual data. The encoding module 256 can generate a URL that includes the encoded data. The URL can address a website run by the server system 106 that can parse and decode the encoded data to obtain the measurement data and the contextual data.

The encoding module 256 can generate the encoded data in various manners. In some embodiments, the encoding module 256 can generate the encoded data to have a reduced or smaller total character length (or text length). For example, the encoding module 256 can generate encoded data so that the total character length of the encoded data is less than the total character length of the measurement data and the contextual data prior to encoding.

In some embodiments, the encoding module 256 can abbreviate or omit some measurement data or contextual data in a URL such that the length (e.g., number of alphanumeric characters) of the URL can be advantageously shortened, as discussed in more detail in relation to the server system 106. When a data store accessible by the server system 106 contains information that would be otherwise included in a URL, that information can be abbreviated in or omitted from the URL. As just one example, assume that a test device 200 performed a test of a particular type. In this example, assume further that the particular type of test involves measurements of predetermined (or known) parameters (e.g., predetermined wavelengths, predetermined frequencies, predetermined time intervals, etc.). In this example, when the URL contains an identification of the particular type of test, the server system 106 can determine the particular type of test from the URL. Further, the server system 106 can access the data store and determine that the particular type of test is associated with the predetermined, known parameters. As a result, the encoding module 256 can generate the URL without specifying the predetermined, known parameters. In this example, the encoding module 256 thus can encode the parameter values in the URL without their corresponding parameters. Assume further in this example that parameters and parameter values associated with the particular type of test are typically set forth in a predetermined sequence. Accordingly, the encoding module 256 can include the encoded parameter values in the predetermined sequence in the URL without the need to also include the parameter associated with each parameter value. Upon receipt of the URL, the server system 106 can determine the parameter associated with each decoded parameter value based on the predetermined sequence.

Based on information already known by the server system 106, the encoding module 256 can perform many different optimizations to decrease the length of a URL associated with a test. As just one example, assume that a particular type of a test is associated with parameter values of a predetermined, known unit (e.g., dBm, GHz, nm, etc.). In this example, the encoding module 256 can include the encoded numerical parameter values without a unit because the server system 106 can know the predetermined, known unit to associate with the parameter values. As another example, the encoding module 256 can abbreviate an expression of a parameter when the server system 106 already knows that the abbreviation represents the parameter. For example, the encoding module 256 can abbreviate a full expression of a parameter associated with a measurement at 1270 nm (e.g., "1270 nm") to generate the abbreviation "28" (or some other string) and include the abbreviation in the URL instead of the full expression. As yet another example, the encoding module 256 can include a parameter and parameter value indicating a type of test that was performed instead of a full expression of the type of test. For example, the encoding module 256 can include in a URL a parameter (e.g., "M") and associated parameter value (e.g., "A") to identify the particular type of test (e.g., XGPON burst mode) or another parameter value (e.g., "E2") to identify another type of test. Many variations are possible.

The encoding module 256 can utilize various other techniques to generate encoded data. In some embodiments, the encoding module 256 can generate encoded data using a data compression technique applied to the measurement data and the contextual data. In some embodiments, the encoding module 256 can generate encoded data that is not human readable so that the underlying measurement data and the contextual data cannot be manually discerned or otherwise decoded. For example, the encoding module 256 can generate abbreviations of expressions of parameters or parameter values to include in a URL that cannot be readily deciphered to obtain the expressions. The foregoing are merely examples. Other variations can be implemented in other examples.

As just one illustration, the test device 200 can perform a test on a communications network. Assume in this illustration that the type of test involves measurement of power levels at five wavelengths in a XGPON (10 Gbit/s passive optical network) network. The test can be performed by a test device 200 associated with a unique identifier, such as a serial number (e.g., "TSPB03SC910247"). Assume further in this illustration that the five wavelengths at which power levels are measured are 1270 nm, 1310 nm, 290 nm, 1550 nm, and 1577 nm, and that the measured power levels at these wavelengths are, respectively, −40.32 dBm, −40.06 dBm, <−95 dBm, −21.64 dBm, and <−95 dBm. In this illustration, the measurement data can include the wavelengths at which the power levels are measured as parameters, and the measured power level values as associated parameter values. The contextual data can include the type of test performed by the test device 200 and the serial number of the test device 200.

In this illustration, the encoding technique performed by the encoding module 256 can obtain the measurement data and the contextual data, and encode the data through various operations to generate encoded data. For example, the encoding technique can multiply parameter values by a selected number to remove decimal values in the parameter values. As another example, the encoding technique then can convert parameters and parameter values into an alphanumeric string and parse the string by a selected base number. As yet another example, the encoding technique then can convert special characters (e.g., "<", ">", "%", etc.) based on browser readable URL encoding. For example, "<" (is less than) can be converted to "% 3C". In addition, the encoding technique can encode the type of test performed by the test device 200 as well as the serial number of the test device 200.

Figure 3:
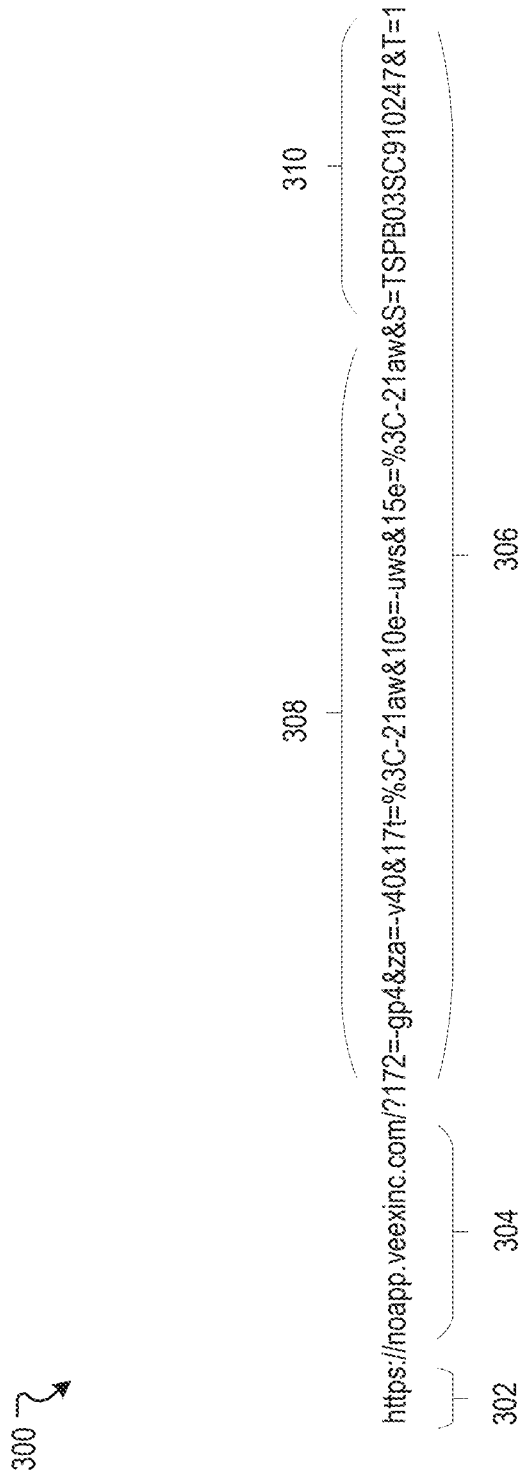
FIG. 3 illustrates an example URL, according to various embodiments of the present technology.

Further, in this illustration, the encoding module 256 can generate a URL based on the encoded data. The URL can address a website run by the server system 106. The URL can include a domain (and subdomain) associated with the website. The URL further can include the encoded data associated with the measurement data and the contextual data. FIG. 3 is an example URL 300 generated by the encoding module 256, according to various embodiments of the present technology. The URL 300 can include a scheme portion 302, a domain portion 304, and a data portion 306. In this example, the scheme portion 302 can specify HTTPS. The domain portion 304 can specify an example subdomain, second level domain, and a top level domain that address a website run by an entity that can provide (serve up) pages for the computing device 104. The data portion 306 can include an encoded data portion 308 and an encoded contextual data portion 310. The encoded data portion 308 can include encoded data representative of the parameters and associated parameter values resulting from a test performed by the test device 102. The encoded contextual data portion 310 can include the serial number (e.g., "TSPB03SC910247") of the test device 102 and an indication of the type of test (e.g., test type="1") performed by the test device 102. The contents and structure of the URL 300 are merely an example. In some embodiments, the encoding module 256 can perform other encoding techniques involving other encoding operations to generate other types of encoded data to be included in other URLs. In some embodiments, the measurement data and the contextual data can be encrypted and then included in a URL. Many variations are possible.

The data module 258 can cause the measurement data and the contextual data to be stored in an NFC device 208 of the test device 200 for access by an NFC reader. In some embodiments, the measurement data and the contextual data can be stored in in the NFC device 208 after being encrypted. In some embodiments, the measurement data and the contextual data can be included in a URL and stored in in the NFC device 208. In some embodiments, the measurement data and the contextual data can be stored in the NFC device 208 without being encrypted or included in a URL. Many variations are possible.

The data module 258 can selectively remove data stored in the NFC device 208. In some embodiments, the data module 258 can selectively remove data stored in the NFC device 208 that was provided by the NFC reader. For example, data stored in the NFC device 208 can be organized into various files. Each file can be associated with a particular test, a particular communications network being tested, a particular date, or some other consideration by which to create a file. The NFC reader can read one or more of the files stored in the NFC device 208. Upon receipt of a file, the NFC reader can provide an acknowledgement to the NFC device 208 that the file has been received by the NFC reader. Upon receipt of the acknowledgement or after a threshold amount of time after receipt of the acknowledgement by the NFC device 208, the data module 258 can cause the file to be removed from the NFC device 208. In some instances, the data module 258 can remove the file from the NFC device 208 after receipt of permission by the operator.

In addition, the data module 258 can cause data stored in the NFC device 208 to be accessible to the test device 200. For example, the NFC device 208 can receive data from the NFC reader. The data module 258 can cause the data received from the NFC reader to be presented through the display 210. Based on presentation of the data through the display 210, the operator can view the data. Further, the operator can perform additional tests through the test device 200 as indicated by the data received from the NFC reader.

Figure 4:
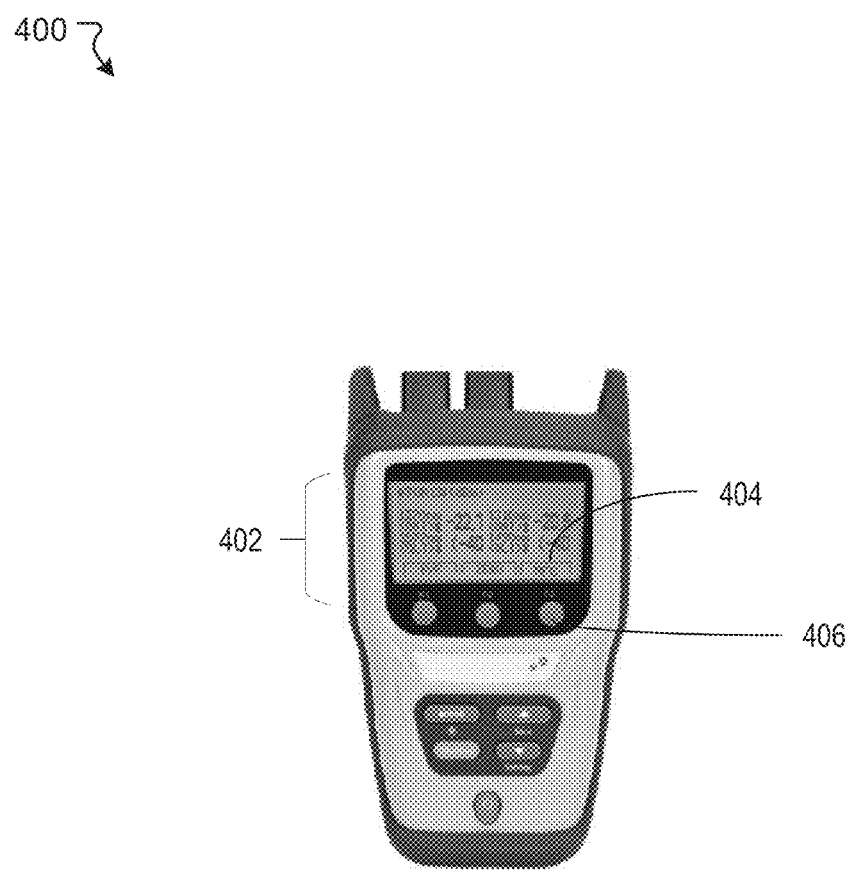
FIG. 4 illustrates an example test device, according to various embodiments of the present technology.

FIG. 4 illustrates an example test device 400 that is capable of storing measurement data and contextual data in an NFC device of the test device 400, according to various embodiments of the present technology. In some embodiments, the test device 400 can be the test device 102 or can be implemented as the test device 200. The test device 400 can include an indication 404 presented through a display 402 of the ability of the test device 400 to store measurement data and contextual data in an NFC device of the test device 400. The indication 404 can be associated with or adjacent to a button 406 (e.g., physical button) of the test device 400. Upon depression of the button 406, the test device 400 can store in the NFC device measurement data and contextual data associated with a test performed by the test device 400. As discussed, in some embodiments, the measurement data and the contextual data can be stored in the NFC device without encoding. In some embodiments, the measurement data and the contextual data can be stored in the NFC device after the data is encoded. The encoding process can be performed as discussed herein. In some embodiments, the measurement data and the contextual data can be included or represented in a URL that addresses a website that can render a page displaying the measurement data and the contextual data.

In some embodiments, other mechanisms can be used to trigger storage of measurement data and contextual data in the NFC device. For example, the display 402 can be a touchscreen through which an interface can be presented to an operator of the test device 400. The interface can include an icon or other reference indicating the ability to store measurement data and contextual data in an NFC device of the test device 400. Upon receipt of a gesture by the operator applied to the touchscreen selecting the reference, the test device 400 can cause the measurement data and the contextual data to be stored in the NFC device. In some embodiments, the measurement data and the contextual data, or encoded versions thereof, can be automatically stored in the NFC device upon completion of a test. In some embodiments, the test device 400 does not have a display 402. For example, a button or other physical input mechanism can be provided when the test device 400 does not have a display. Upon depression of the button, the test device 400 can store in the NFC device the measurement data and the contextual data associated with a test performed by the test device 400. Many variations are possible.

Figure 5:
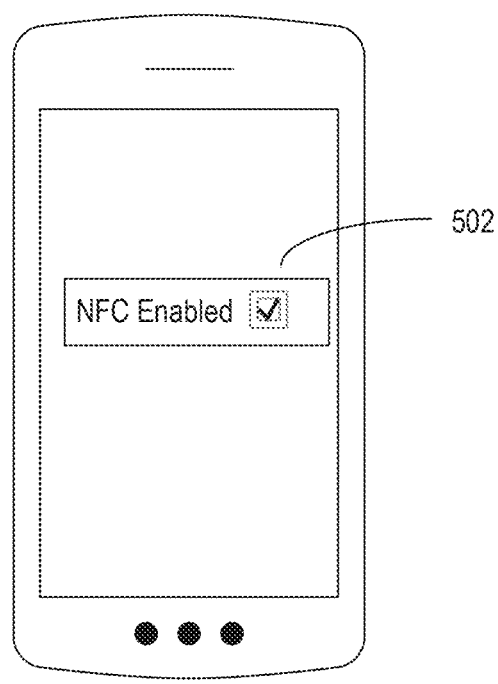
FIG. 5 illustrates an example computing device, according to various embodiments of the present technology.

FIG. 5 illustrates an example computing device 500 that is capable of functioning as an NFC reader, according to various embodiments of the present technology. In some embodiments, the computing device 500 can be the computing device 104. The computing device 500 can be any computing device that is appropriately configured to read data from an NFC device of the test device 400 and to transmit data to the NFC device of the test device 400. In some embodiments, the computing device 500 can have an operating system or an application that has an NFC reader. The computing device 500 can include a browser (or web browser). The browser can be any browser that is appropriately configured to render pages from a website addressed by a URL read from the NFC device. In some embodiments, the computing device 500 does not include, store, or execute any software (e.g., an application) that is generated, licensed, owned, maintained, or otherwise offered by the entity that manufactures or sells the test device 400. In some embodiments, the computing device 500 does not include, store, or execute any software (e.g., an application) that is generated, licensed, owned, maintained, or otherwise offered by the entity that controls or operates the server system 106. As shown, the computing device 500 is enabled to perform as an NFC reader to read data, such as the measurement data and the contextual data, stored in the NFC device of the test device 400. The computing device 500 can display an indication 502 that NFC capabilities have been enabled on the computing device 500. For example, through interaction with an interface presented through the computing device 500, an option can be selected to enable NFC capabilities of the computing device 500. For example, the reading of the NFC device by the computing device 500 can obtain the URL contained in the NFC device. Based on the URL, the browser on the computing device 500 can initiate communications over a network (e.g., Internet) between the device 500 and a website of the server system 106 addressed by the URL. In addition, the computing device 500 through its NFC reader can transmit data to the NFC device of the test device 400.

Figure 6:
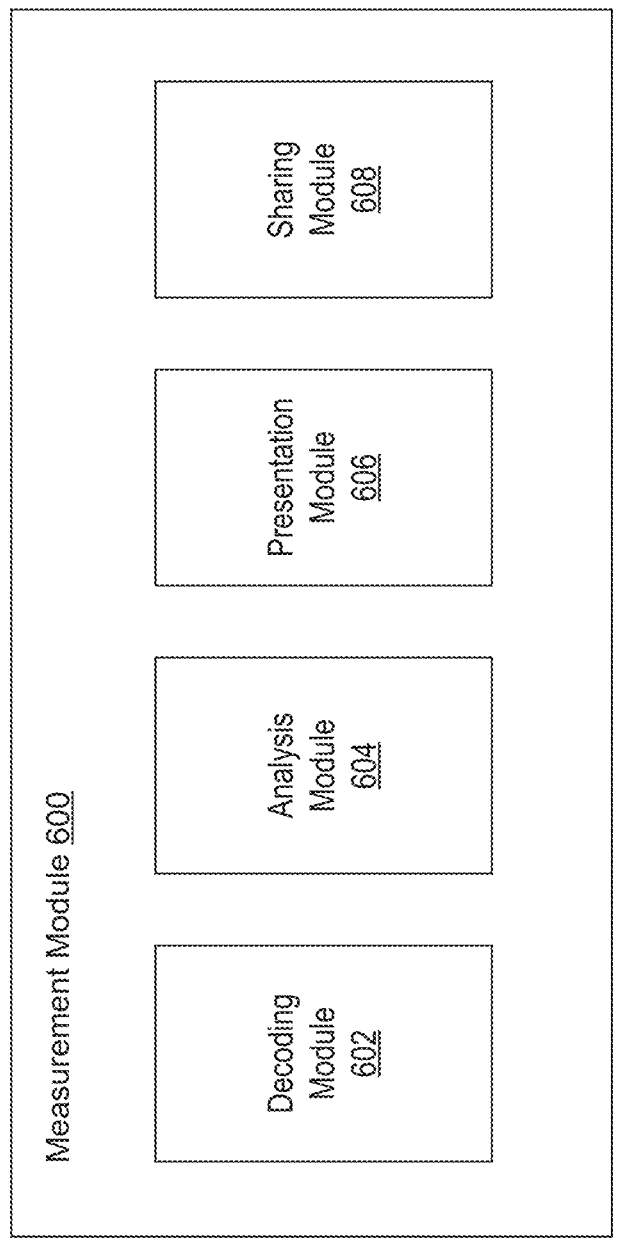
FIG. 6 illustrates an example measurement module associated with a server system, according to various embodiments of the present technology.

FIG. 6 illustrates an example measurement module 600, according to various embodiments of the present technology. The functionality of the measurement module 600 can be performed by a website and an associated server system, such as the server system 106. The website can be addressed by a URL that was read by an NFC reader of the computing device 500 from the NFC device of the test device 102 (or test device 400). The measurement module 600 can include a decoding module 602, an analysis module 604, a presentation module 606, and a sharing module 608.

The decoding module 602 can parse a URL and extract encoded data from the URL. The decoding module 602 can decode the encoded data in the URL. In some embodiments, the decoding module 602 can decode the encoded data by performing in "reverse" the sequence of operations used to generate the encoded data. As just one example, and further to the above illustration relating to the test involving measurement of power levels in a XGPON network by the test device 102, the decoding module 602 can decode the encoded data in the URL generated in response to the test. First, the "% 3C" can be automatically converted to "<" by the browser. The decoding module 602 can parse the URL to obtain the encoded parameters and associated parameter values. The decoding module 602 then can apply the selected base number to the encoded data to obtain alphanumeric strings. The decoding module 602 then can convert the alphanumeric strings to values associated with the parameters and parameter values. The decoding module 602 then can divide the values associated with the parameters and the parameter values by the selected number to obtain the parameters and parameter values. The decoding module 602 then can parse the URL to obtain the serial number of the test device 102 and the type of test performed. The foregoing is merely an example decoding technique. The decoding module 602 can perform other types of decoding techniques based on the encoding technique selected to generate encoded data to be included in a URL. Many variations are possible.

The analysis module 604 can analyze the decoded measurement data and contextual data. In some embodiments, the analysis module 604 can access a data store of the server system 106 that maintains information associated with a plurality of test devices. In some embodiments, the plurality of test devices can include some or all of the test devices 102 manufactured, sold, or otherwise offered by an entity, such as the entity that also controls or operates the server system 106. In some embodiments, the plurality of test devices can include some or all of the test devices 102 manufactured, sold, or otherwise offered by other entities that do not control or operate the server system 106. The plurality of test devices can be owned, deployed, or otherwise used by personnel associated with one or more organizations, such as network service providers or companies providing network testing services. An organization can employ, contract, or otherwise utilize field technicians to operate, maintain, or troubleshoot communications networks on which the plurality of test devices can perform testing.

The data store can maintain various types of information associated with the plurality of test devices. For example, the information can include an identifier (e.g., serial number) for each of the plurality of devices. The information can also indicate, for each test device, the type of the test device, such as whether the test device is a power meter, spectrum analyzer, sweep system, monitoring system, installation tester, fiber inspector, fault locator, channel checker, light source, etc. As another example, the information can associate each test device with one or more field technicians to whom the test device has been assigned. As still another example, the information can indicate skill levels of field technicians and indicate the types of tests that a field technician is qualified to conduct. As yet another example, the information can indicate a schedule of tests that have been performed or will be performed by a particular test device. Further, the information can contain parameters and associated parameter values measured by tests performed by the plurality of test devices. The information also can indicate the date, time, and location associated with the performance of a test or the date, time. In addition, the information can identify one or more field technicians who performed or are intended to perform each scheduled test. Further, the information can specify the type of test performed or to be performed for each scheduled test. In addition, the information can indicate the parameters tested or to be tested for each type of test. Further, the information can indicate a predetermined sequence of parameters to be tested or recorded for a particular test type. In addition, the information can include abbreviations or codes that represent full expressions of parameters or parameter values. As yet another example, the information can indicate an operating status of a test device, such as whether the test device is in service, in a warehouse, or in repair. Many different types of information associated with the plurality of test devices other than those expressly described can be maintained in the data store.

In some embodiments, the data store can store the information associated with the plurality of test devices as look up tables. The data store can be populated with information as the information becomes known to the server system 106. In some embodiments, the information associated with the plurality of test devices can be based on information provided by one or more organizations that own, control, or otherwise utilize the plurality of test devices. For example, the information provided by the organizations can be periodically or continuously received by the server system 106 (or entity that operates and controls the server system 106) through a suitably planned test device registration and update process in which the organizations participate.

Based on measurement data or contextual data, which can be determined from a URL, the analysis module 604 can look up or otherwise determine relevant data from the information associated with the plurality of test devices maintained in the data store. When relevant data is accessible from the data store and can be determined based on other data embedded in a URL, the URL need not be generated to include the relevant data. For example, based on an identifier (e.g., serial number) of a test device 102 that is included in a URL, the analysis module 604 can determine a date, time, and location of a test performed by the test device 102 from the information maintained in the data store. As another example, based on an identifier of a test device 102 that is included in a URL, the analysis module 604 can determine a type of test performed by the test device 102 from the information maintained in the data store. As still another example, based on a type of a test performed by a test device 102 and parameter values associated with the test that are included in a URL, the analysis module 604 can determine each parameter associated with each parameter value based on a predetermined sequence of the parameters from the information maintained in the data store. As yet another example, based on an identifier of a test device 102 included in a URL, the analysis module 604 can determine a field technician who performed a test from the information maintained in the data store. The foregoing are merely examples of relevant information that can be determined through access to or a search of the data store. The analysis module 604 can look up or otherwise determine any type of data relevant to a test device 102 or test performed by the test device 102 that is contained in the data store.

The analysis module 604 can perform validations and checks based on information maintained in the data store. In some embodiments, the analysis module 504 can detect anomalies or other exceptions in connection with the plurality of test devices. The analysis module 604 can identify an exception based on inconsistency between information in the data store and data extracted from a URL. For example, information in the data store can indicate that a particular field technician is assigned to perform a particular test at a particular test location. When data extracted from a URL indicates that a different field technician performed the particular test at the particular test location, the analysis module 604 can identify an exception. As another example, information in the data store can indicate that a particular field technician is qualified to perform permitted types of tests. When data extracted from a URL indicates that the field technician performed a test that was not of the permitted type, the analysis module 604 can identify an exception. Upon identification of an exception, the analysis module 604, for example, can request an explanation of the exception or provide a notification about the exception to appropriate personnel.

The presentation module 606 can automatically include various types of information on a page to be provided for the computing device 500 (or computing device 104). The page can be provided to the computing device 500 and rendered by a browser of the computing device 500. The presentation module 606 can generate the page to automatically include decoded measurement data and contextual data from a URL associated with a test performed by a test device 102 (or the test device 200 or the test device 400) on a communications network. The presentation module 606 can generate the page to also automatically include various types of information associated with the test device 102 that are maintained in the data store accessible by the analysis module 604. As discussed, the various types of information can include, for example, a date, time, and location of a test; a type of a test; particular parameters evaluated during a test of a particular type; a field technician who performed a test; etc. In some embodiments, the presentation module 606 can generate the page to include relevant historical information based on the information maintained in the data store. For example, the historical information can include prior tests performed on the communications network and results (e.g., parameters and associated parameter values) of the prior tests. The presentation module 606 can generate different types of pages with different types or amounts of data, complexity, and stylization. For example, one type of page can include text only. As another example, one type of page can include text as well as different options to share the data presented on the page through different mechanisms.

The page can include an option for a field technician to manually provide additional information. For example, an icon can be selected through a touch gesture applied to a touchscreen on the computing device 500 through which the page appears. Upon selection of the icon, the presentation module 606 can generate an updated or revised page to prompt a field technician to provide additional data. For example, the page can provide various blank fields to prompt the field technician to provide an email address, a name, an identifier for the field technician, an identifier for a job during which a test was performed, any comments that the field technician may wish to provide about the job or the test, or other information. As another example, the page can provide an icon to allow the field technician to upload one or more files, such as images. The images can relate to aspects of a job or a test. In one instance, the images can capture a state of a communications network prior to a job during which a test is performed and a state of the communications network after completion of the job or the test. In another instance, the images can capture one or more screens of the test device 102 that display parameters and parameter values or other test results generated by the test device 102. As yet another example, the page can prompt provision of location information. For instance, a field technician can select an icon to cause the computing device 500 to determine location information (e.g., GPS information) of the computing device 500, which can be automatically loaded on the page. In some embodiments, the additional information can be provided as evidence to establish that the field technician has successfully completed a job or a test.

The presentation module 606 can generate the page to include a variety of sharing modes as options to communicate or share the information on the page. For example, the options can include an option to create a file (e.g., a .pdf file) of the information; an option to upload the information to cloud storage; an option to email the information; or, an option to send the information via text messaging. In some embodiments, other modes of sharing are possible.

The sharing module 608 can communicate or share the information provided on a page. The information can be communicated according to a selected sharing option. For example, if a field technician selects an option to create a .pdf file of the information, the sharing module 608 can cause a .pdf file including the information to be generated. As another example, if the field technician selects an option to upload the information to cloud storage, the sharing module 608 can provide the information to cloud storage within the server system 106 or elsewhere. For example, the cloud storage can be controlled or operated by an entity with which the field technician is affiliated or employed, or an entity operating the communications network on which the field technician performed a test. As yet another example, if the field technician selects an option to email the information or send the information via text messaging, the sharing module 608 can cause the information to be conveyed through, respectively, an email system or a text messaging system for receipt by desired recipients. In this example, the information can be embedded directly in an email or text message or included in a file attached to an email or text message.

Figure 7:
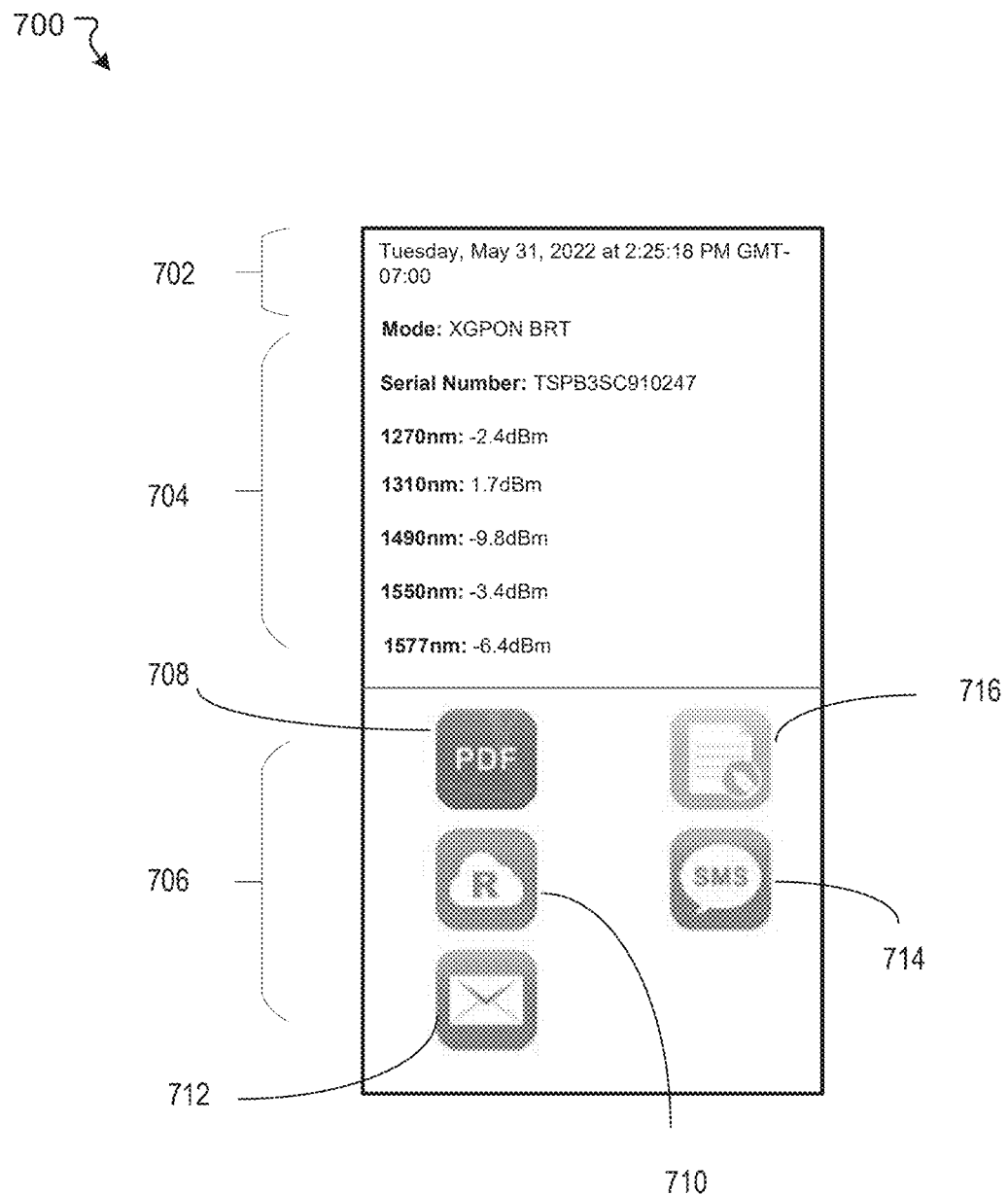
FIGS. 7-8 illustrate example pages, according to various embodiments of the present technology.
Figure 8:
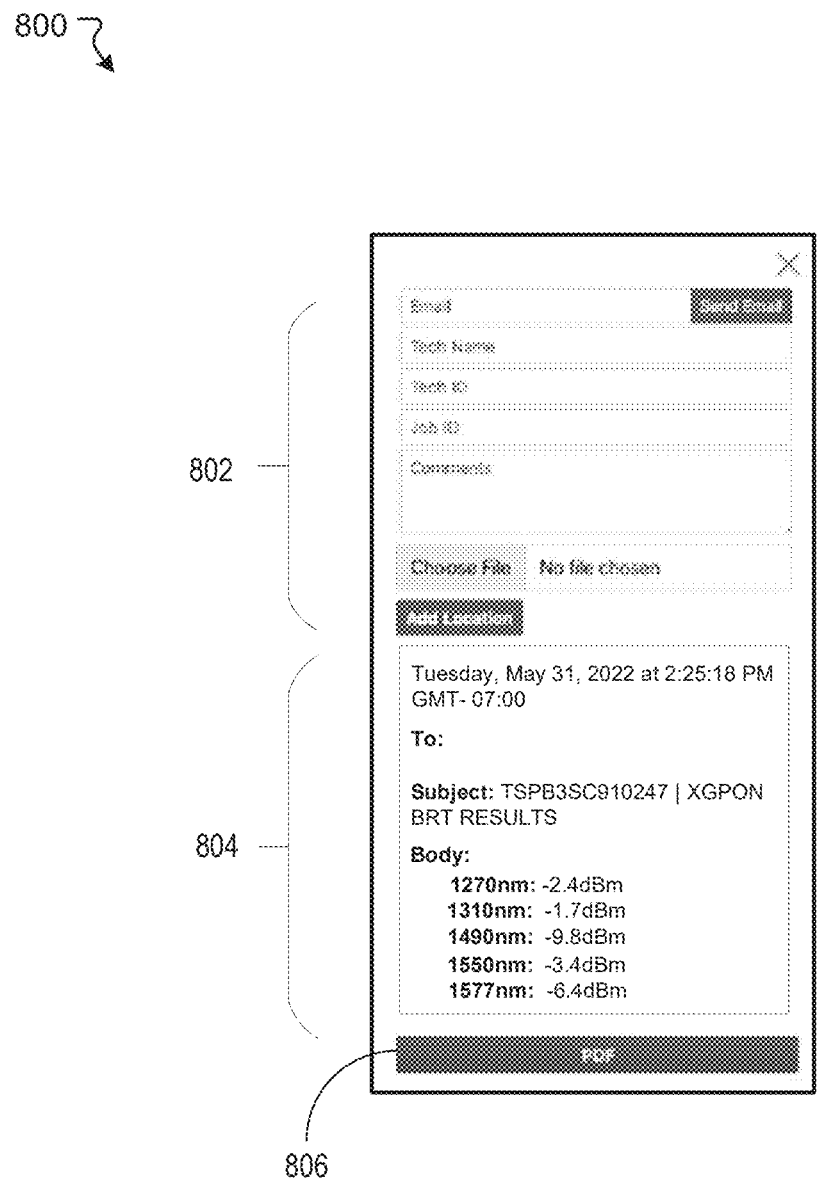

FIGS. 7-8 illustrate examples of pages generated by the measurement module 600, according to various embodiments of the present technology. In FIG. 7, an example page 700 is generated for rendering through a browser on the computing device 500 (or computing device 104). The page 700 can be displayed on the computing device 500 immediately after data, such as one or more files, stored in the NFC device of the test device 102 (or the test device 400) is read by the NFC reader of the computing device 500. The page 700 can contain various types of information. For example, as shown, the page 700 can include a section 702 including a time stamp. The time stamp can indicate the time and date when the test device 102 performed a test that prompted associated measurement data and contextual data to be stored in the NFC device of the test device 102. The page 700 can include a section 704 that includes contextual data and measurement data. As shown, the contextual data includes a type (or "mode") of test that was performed and a serial number of the test device 102 that performed the test. The measurement data resulting from the test includes various wavelengths as parameters and measured power levels as parameter values. The page 700 can include a section 706 that includes sharing options. The sharing options can include an option 708 to create a file (e.g., a .pdf file) containing the information displayed on the page 700, an option 710 to upload the information to cloud storage, an option 712 to communicate the information via email, an option 714 to communicate the information via text messaging, and an option 716 to provide additional information on the page 700. In other examples, the page 700 can contain more types of information or fewer types of information than shown.

In FIG. 8, an example revised page 800 is generated in response to selection of the option 716 to provide additional information. The example page 800 includes a section 802 having fields through which additional information can be provided. As shown, the additional information to be provided can include an email address of a field technician, an identifier of the field technician, a job identifier associated with a job during which a test was performed, and comments from the field technician. The section 802 also can include options for the field technician to upload files (e.g., images) and to add location information regarding where the field technician is located or where the test was performed. In other examples, the page 800 can prompt provision of other types of information. The page 800 also can include a section 804 that includes information that previously appeared on the page 700.

Figure 9:
FIG. 9 illustrates an example file, including various information provided on a page, according to various embodiments of the present technology.

The page 800 can include an option 806 to create a file of the information on the page 800. The option 806 can be selected by the field technician to create a .pdf file of the information on the page 800. The .pdf file can be generated to protect the information from alteration. FIG. 9 illustrates an example file 900 including various information provided on a page, according to various embodiments of the present technology. The file 900, such as a .pdf file, can be generated to include the information on the page 800. As shown, the file 900 includes a time stamp of the time and date when the test was performed, location data of the computing device 500, an email address of an intended recipient (e.g., the field technician who performed the test, operator of communications network on which the test was performed, etc.) of the information, a serial number of the test device 102, an identification of the type of test performed, measurement data determined from the test, the name of a field technician, an identifier of the field technician, a job identifier of a job associated with the test, and comments provided by the field technician. In other examples, the file 900 can include other types of information based on the selection of information that appears on the page 800.

Figure 10:
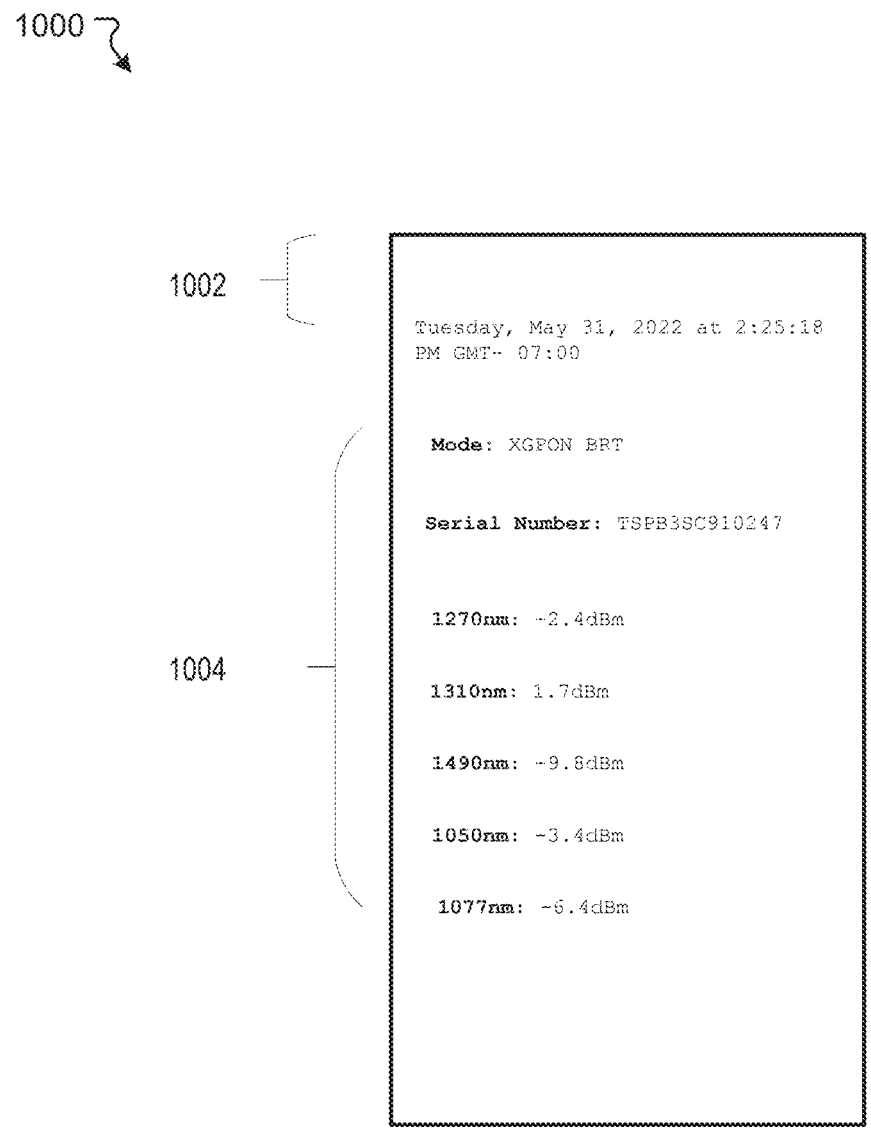
FIG. 10 illustrates an example page of a computing device, according to various embodiments of the present technology.

FIG. 10 illustrates an example page 1000 of a computing device, according to various embodiments of the present technology. For example, the computing device can be any suitable mobile computing device, such as a smartphone. The computing device can include an NFC reader that can receive data stored in the NFC device of the test device 400

(or the test device 102). For purposes of illustration, and like the example of a test discussed above in connection with FIG. 7, assume that a type of test conducted by the test device 400 involves measurement of power levels at five wavelengths in a XGPON (10 Gbit/s passive optical network) network. The test device 400 can be associated with a unique identifier, such as a serial number (e.g., "TSPB03SC910247"). Assume further in this illustration that the five wavelengths at which power levels are measured are 1270 nm, 1310 nm, 290 nm, 1550 nm, and 1577 nm, and that the measured power levels at these wavelengths are, respectively, −40.32 dBm, −40.06 dBm, <−95 dBm, −21.64 dBm, and <−95 dBm. In this illustration, the measurement data can include the wavelengths at which the power levels are measured as parameters, and the measured power level values as associated parameter values. The contextual data can include the type of test performed by the test device 400 and the serial number of the test device 400. The measurement data and the contextual data can be stored in the NFC device. As discussed, the measurement data and the contextual data can be stored in the NFC device automatically after performance of the test or in response to an operator of the test device 400 taking action (e.g., depressing a button) to trigger storage of the measurement data and the contextual data. The NFC reader of the computing device can read the NFC device and cause the acquired measurement data and the acquired contextual data to be presented on the page 1000.

The page 1000 can be a static page with only text information. In some embodiments, the page 1000 can be generated without the use of a separate server or associated website. The page 1000 can contain various types of information. For example, as shown, the page 1000 can include a section 1002 including a time stamp. The time stamp can include the time and date when the computing device read the measurement data and the contextual data from the NFC device. In another example, the time stamp can indicate the time and date when the test device 400 performed the test that resulted in the measurement data and the contextual data. The page 1000 can include a section 1004 that includes the contextual data and the measurement data associated with the test. As shown, the contextual data includes a type (or "mode") of test that was performed and a serial number of the test device 400 that performed the test. The measurement data resulting from the test includes the various wavelengths as parameters and measured power levels as parameter values.

FIG. 11 illustrates an example method 1100, according to various embodiments of the present technology. It should be appreciated that there can be additional, fewer, or alternative steps performed in similar or alternative orders, or in parallel, within the scope of the various embodiments discussed herein unless otherwise stated.

At block 1102, the method 1100 can determine, by a device, one or more parameters and associated parameter values of a network operating condition. At block 1104, the method 1100 can store, by the device, data associated with on the one or more parameters and associated parameter values in a Near-Field Communication (NFC) device of the device. At block 1106, the method 1100 can provide, by the device, the data to a computing system that is different from the device. It is contemplated that there can be many other uses, applications, and/or variations associated with the various embodiments of the present technology.

FIG. 12 illustrates an example method 1200, according to various embodiments of the present technology. It should be appreciated that there can be additional, fewer, or alternative steps performed in similar or alternative orders, or in parallel, within the scope of the various embodiments discussed herein unless otherwise stated.

At block 1202, the method 1200 can obtain encoded data in a URL contained in a code associated with a test performed on a communications network. At block 1204, the method 1200 can decode the encoded data to determine at least one of measurement data or contextual data associated with the test. At block 1206, the method 1200 can provide the at least one of measurement data or contextual data on a page for presentation on a computing device. It is contemplated that there can be many other uses, applications, and/or variations associated with the various embodiments of the present technology.

Figure 13:
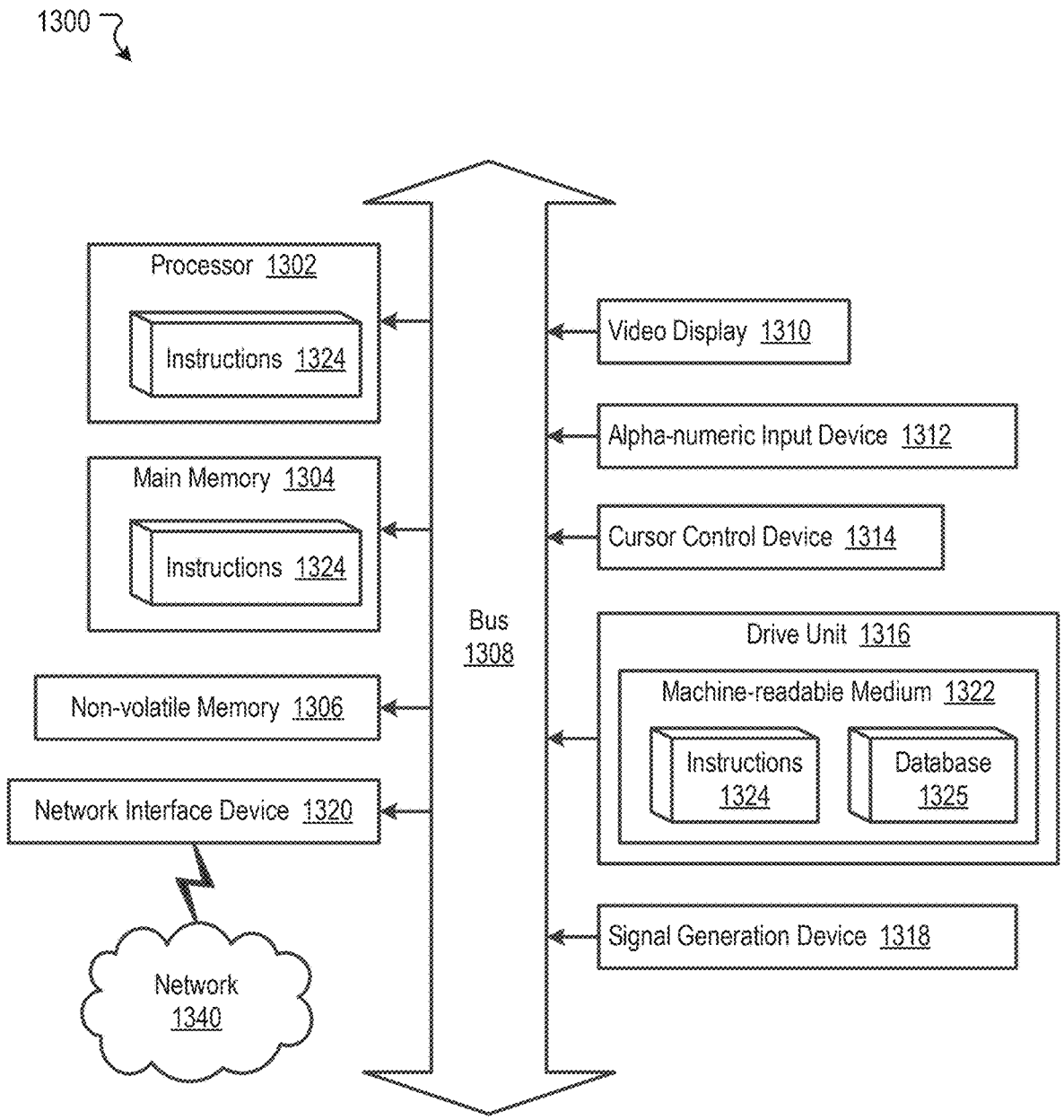
FIG. 13 illustrates an example of a computing system, according to various embodiments of the present technology.

The foregoing processes and features can be implemented by a wide variety of machine and computing system architectures and in a wide variety of network and computing environments. FIG. 13 illustrates an example of a computing system (or computing device) 1300 that may be used to implement one or more of the embodiments described herein according to various embodiments of the present technology. The computing system 1300 includes sets of instructions 1324 for causing the computing system 1300 to perform the processes and features discussed herein. The computing system 1300 may be connected (e.g., networked) to other machines and/or computer systems. In a networked deployment, the computing system 1300 may operate in the capacity of a server or a client machine in a client-server network environment, or as a peer machine in a peer-to-peer (or distributed) network environment.

The computing system 1300 includes a processor 1302 (e.g., a central processing unit (CPU), a graphics processing unit (GPU), or both), a main memory 1304, and a nonvolatile memory 1306 (e.g., volatile RAM and non-volatile RAM, respectively), which communicate with each other via a bus 1308. In some embodiments, the computing system 1300 can be a desktop computer, a laptop computer, personal digital assistant (PDA), or mobile phone, for example. In one embodiment, the computing system 1300 also includes a video display 1310, an alphanumeric input device 1312 (e.g., a keyboard), a cursor control device 132 (e.g., a mouse), a drive unit 1316, a signal generation device 1318 (e.g., a speaker) and a network interface device 1320.

In one embodiment, the video display 1310 includes a touch sensitive screen for user input. In one embodiment, the touch sensitive screen is used instead of a keyboard and mouse. The disk drive unit 1316 includes a machine-readable medium 1322 on which is stored one or more sets of instructions 1324 (e.g., software) embodying any one or more of the methodologies or functions described herein. The instructions 1324 can also reside, completely or at least partially, within the main memory 1304 and/or within the processor 1302 during execution thereof by the computing system 1300. The instructions 1324 can further be transmitted or received over a network 1340 via the network interface device 1320. In some embodiments, the machine-readable medium 1322 also includes a database 1325.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 1306 may also be a random access memory. The non-volatile memory 1306 can be a local device coupled directly to the rest of the components in the computing system 1300. A non-volatile memory that is remote from the system, such as a network storage device coupled to any of the computer systems described herein through a network interface such as a modem or Ethernet interface, can also be used.

While the machine-readable medium 1322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computing system 1300 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 1300 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a device, one or more parameters and associated parameter values of a network operating condition;
   storing, by the device, data associated with the one or more parameters and associated parameter values in a Near-Field Communication (NFC) device of the device; and
   providing, by the device, the data to a computing system that is different from the device, wherein the data is readable by the computing system without interaction between the computing system and a display.

2. The computer-implemented method of claim 1, wherein the data is readable by an NFC reader of the computing system when the NFC reader is within a predetermined distance from the NFC device.

3. The computer-implemented method of claim 1, wherein the device includes the display.

4. The computer-implemented method of claim 1, wherein the providing the data to the computing system is performed by the NFC device when the device is not powered on.

5. The computer-implemented method of claim 1, further comprising:
   receiving, by the device, data from an NFC reader of the computing system.

6. The computer-implemented method of claim 1, further comprising:
   removing, by the device, the data from the NFC device in response to receipt of an acknowledgement that an NFC reader received the data.

7. The computer-implemented method of claim 1, wherein the data is associated with a URL.

8. The computer-implemented method of claim 1, wherein the data is encrypted.

9. The computer-implemented method of claim 1, wherein the data is decrypted and decoded by a server system or a custom application running on the computing system to determine the one or more parameters and associated parameter values.

10. The computer-implemented method of claim 1, wherein a custom application running on the computing system can read and decode a URL associated with the data and render a page including the one or more parameters and associated parameter values without a web browser or a server system.

11. A device comprising:
    at least one processor; and
    a memory storing instructions that, when executed by the at least one processor, cause the device to perform operations comprising:
    determining one or more parameters and associated parameter values of a network operating condition;
    storing data associated with the one or more parameters and associated parameter values in a Near-Field Communication (NFC) device of the device; and
    providing the data to a computing system that is different from the device, wherein the data is readable by the computing system without interaction between the computing system and a display.

12. The device of claim 11, wherein the data is readable by an NFC reader of the computing system when the NFC reader is within a predetermined distance from the NFC device.

13. The device of claim 11, wherein the device includes the display.

14. The device of claim 11, wherein the providing the data to the computing system is performed by the NFC device when the device is not powered on.

15. The device of claim 11, wherein the operations further comprise:
    receiving data from an NFC reader of the computing system.

16. A non-transitory computer-readable storage medium including instructions that, when executed by at least one processor of a device, cause the device to perform operations comprising:
    determining one or more parameters and associated parameter values of a network operating condition;
    storing data associated with the one or more parameters and associated parameter values in a Near-Field Communication (NFC) device of the device; and
    providing the data to a computing system that is different from the device, wherein the data is readable by the computing system without interaction between the computing system and a display.

17. The non-transitory computer-readable storage medium of claim 16, wherein the data is readable by an NFC reader of the computing system when the NFC reader is within a predetermined distance from the NFC device.

18. The non-transitory computer-readable storage medium of claim 16, wherein the device includes the display.

19. The non-transitory computer-readable storage medium of claim 16, wherein the providing the data to the computing system is performed by the NFC device when the device is not powered on.

20. The non-transitory computer-readable storage medium of claim 16, wherein the operations further comprise:

receiving data from an NFC reader of the computing system.

\* \* \* \* \*